(12) United States Patent
Yamada et al.

(10) Patent No.: US 11,143,541 B2
(45) Date of Patent: Oct. 12, 2021

(54) SAMPLE CONTAINER AND THERMAL ANALYZER

(71) Applicant: Hitachi High-Tech Science Corporation, Tokyo (JP)

(72) Inventors: Kentaro Yamada, Tokyo (JP); Yasuyuki Takagi, Tokyo (JP)

(73) Assignee: Hitachi High-Tech Science Corporation, Tokyo (JP)

( * ) Notice: Subject to any disclaimer, the term of this patent is extended or adjusted under 35 U.S.C. 154(b) by 16 days.

(21) Appl. No.: 15/468,187

(22) Filed: Mar. 24, 2017

(65) Prior Publication Data
US 2017/0276538 A1 Sep. 28, 2017

(30) Foreign Application Priority Data
Mar. 25, 2016 (JP) .............................. JP2016-061346

(51) Int. Cl.
| | | |
|---|---|---|
| G01N 25/00 | (2006.01) | |
| G01G 9/00 | (2006.01) | |
| G01N 25/20 | (2006.01) | |
| B01L 3/04 | (2006.01) | |
| G01N 5/04 | (2006.01) | |

(52) U.S. Cl.
CPC ............... *G01G 9/00* (2013.01); *G01N 25/20* (2013.01); *B01L 3/04* (2013.01); *G01N 5/04* (2013.01)

(58) Field of Classification Search
CPC combination set(s) only.
See application file for complete search history.

(56) References Cited

U.S. PATENT DOCUMENTS

| | | | |
|---|---|---|---|
| 3,937,359 A | 2/1976 | Stockton, Jr. | |
| 7,416,328 B2* | 8/2008 | Danley | G01G 19/52 236/44 C |
| 8,377,030 B2* | 2/2013 | Hyde | B65D 81/3802 604/404 |
| 2013/0081455 A1* | 4/2013 | Marmier | G01N 5/045 73/76 |

(Continued)

FOREIGN PATENT DOCUMENTS

| | | |
|---|---|---|
| CN | 201348156 Y | 11/2009 |
| GB | 2278202 A | 11/1994 |
| JP | S60-207046 A | 10/1985 |

(Continued)

OTHER PUBLICATIONS

Oct. 2, 2017—(EP) Extended Search Report—App 17162887.8.

(Continued)

*Primary Examiner* — Lisa M Caputo
*Assistant Examiner* — Nasir U. Ahmed
(74) *Attorney, Agent, or Firm* — Banner & Witcoff, Ltd.

(57) ABSTRACT

A sample container of a thermal analyzer that performs thermogravimetry or calorimetry includes a bottomed cylindrical body portion and a cover portion abutting against an opening of the body portion and covering at least a part of the opening. The cover portion includes a first cover portion abutting against an edge portion of the opening and having a second opening in a part of the first cover portion, and a second cover portion separated from the first cover portion in an axial direction of the body portion so as to cover at least a part of the second opening.

4 Claims, 10 Drawing Sheets

(56) References Cited

U.S. PATENT DOCUMENTS

2013/0235899 A1* 9/2013 Nagasawa ............. G01N 25/02
374/14
2016/0189944 A1* 6/2016 Arii ...................... H01J 49/004
250/282

FOREIGN PATENT DOCUMENTS

| JP | S60-209158 A | 10/1985 |
|---|---|---|
| JP | H0550345 U | 7/1993 |
| JP | 2003028820 A | 1/2003 |
| JP | 2009053143 A | 3/2009 |

OTHER PUBLICATIONS

M.D.A. Saldana et al, "Oxidative Stability of Fats and Oils Measured by Differential Scanning Calorimetry for Food and Industrial Applications", in: "Applications of Calorimetry in a Wide Context—Differential Scanning Calorimetry, Isothermal Titration Calorimetry and Microcalorimetry", Jan. 23, 2013, InTech, XP055408166, ISBN: 978-953-51-0947-1, DOI: 10.5772/54486, *p. 449, line 12-p. 452, line 5; figures 3, 4*.
Oct. 4, 2019—(EP) Office Action—App 17162887.8.
Guillaume Speurt: "Candles on Freedom Square (Tallinn, Estonia)(18109722941).jpg—Wikimedia Commons", Mar. 25, 2015 (Mar. 25, 2015), XP055626798,Retrieved from the Internet:URL:https://commons.wikimedia.org/wiki//File"Candles_on_Freedom_Square_(Tallin,_Estonia)_(18109722941).jpg [retrieved on Sep. 27, 2019].

* cited by examiner

TEMPERATURE/DTA          TIME

SAMPLE CONTAINER AND THERMAL ANALYZER

CROSS-REFERENCE TO RELATED APPLICATION

This application claims priority from Japanese Patent Application No. 2016-061346, filed on Mar. 25, 2016, the entire subject matter of which is incorporated herein by reference.

BACKGROUND

The present disclosure relates to a sample container to be used in a thermal analyzer that measures a change in physical property including thermal gravity or calorie of a sample while heating the sample to change temperature thereof, and a thermal analyzer.

In the background art, a method of thermal analysis in which a sample is heated and a physical change of the sample caused by a temperature change is measured has been performed as a method for evaluating temperature properties of the sample. In Japan, the thermal analysis is defined in JIS K 0129:2005 "General rules for thermal analysis", in which any method for measuring physical properties of an object to be measured (sample) while program-controlling the temperature of the sample belongs to the thermal analysis. Methods of thermal analysis generally used can be classified into five methods, that is, (1) differential thermal analysis (DTA) for detecting temperature (difference in temperature), (2) differential scanning calorimetry (DSC) for detecting a difference in thermal flow, (3) thermogravimetry (TG) for detecting mass (change in weight), (4) thermomechanical analysis (TMA) for detecting dynamic characteristics, and (5) dynamic viscoelasticity measurement (DMA).

An equipment called thermogravimetric/differential thermal analyzer (TG/DTA or TG/DSC) is available, which is capable to measure thermal gravity and differential calorie simultaneously.

In a typical thermal analyzer, a sample to be measured and a reference sample are put into a pair of sample containers respectively, and the samples are heated for analysis by a heating furnace disposed around the sample containers.

In a high temperature range, heat transfer by radiation is more dominant than heat conduction from the heating furnace. However, there is a problem that a difference in radiation rate (emissivity) between the sample to be measured and the reference sample leads to a difference in heating state caused by radiation between the sample to be measured and the reference sample to thereby make it difficult to perform proper measurement.

Therefore, a technique in which a heat shielding member is put around the sample containers to reduce influence of radiation has been proposed for a differential scanning calorimeter (DSC). An example of such technique is described in JP-A-S60(1985)-207046.

However, when the heat shielding member disclosed in JP-A-S60(1985)-207046 is applied to thermogravimetry, the inside of the heat shielding member is filled with a self-generated atmosphere generated by thermal decomposition of a sample during thermogravimetry involving a thermal decomposition reaction. Thus, a problem may occur that a reaction with an ambient atmosphere may be inhibited to cause a different result from that of a true reaction of the sample.

SUMMARY

The present disclosure has been made in view of the above-described circumstances, and one of objects of the present disclosure is to provide a sample container and a thermal analyzer in which measurement accuracy of thermogravimetry can be improved without spoiling a thermal decomposition reaction of a sample.

According to an exemplary embodiment of the present disclosure, there is provided a sample container of a thermal analyzer that performs thermogravimetry or calorimetry, the sample container including: a body portion that has a bottomed cylindrical shape; and a cover portion that abuts against an opening of the body portion and covers at least a part of the opening, wherein the cover portion includes a first cover portion and a second cover portion, wherein the first cover portion abuts against an edge portion of the opening of the body portion and has a second opening, and wherein the second cover portion is separated from the first cover portion in an axial direction of the body portion and covers at least a part of the second opening.

According to another exemplary embodiment of the present disclosure, there is provided a sample container of a thermal analyzer that performs thermogravimetry or calorimetry, the sample container including: a body portion that has a bottomed cylindrical shape; and a cover portion that covers at least a part of an opening wherein the cover portion is separated from the body portion in an axial direction of the body portion.

According to another exemplary embodiment of the present disclosure, there is provided a sample container of a thermal analyzer that performs thermogravimetry or calorimetry, the sample container including: a body portion that has a bottomed cylindrical shape; and a cover portion that t has a bottomed cylindrical shape and abuts against an edge portion of an opening of the body portion and covers at least a part of the opening, wherein the cover portion has a cylindrical portion that abuts against the edge portion, the cylindrical portion having a third opening.

According to another exemplary embodiment of the present disclosure, there is provided a sample container of a thermal analyzer that performs thermogravimetry or calorimetry, the sample container including: a body portion that has a bottomed cylindrical shape; and a cover portion that abuts against an edge portion of an opening of the body portion and covers at least a part of the opening, wherein the body portion has a cylindrical portion having a fourth opening.

According to another exemplary embodiment of the present disclosure, there is provided a thermal analyzer that performs thermogravimetry or calorimetry including: a sample container that has a bottomed cylindrical shape and an opening; a heating furnace that surrounds the sample container; and a reflection member that is provided at a position between the sample container and the heating furnace and reflects radiation from the heating furnace.

DETAILED DESCRIPTION

Embodiments according to the present disclosure will be described below with reference to the drawings.

Figure 1:
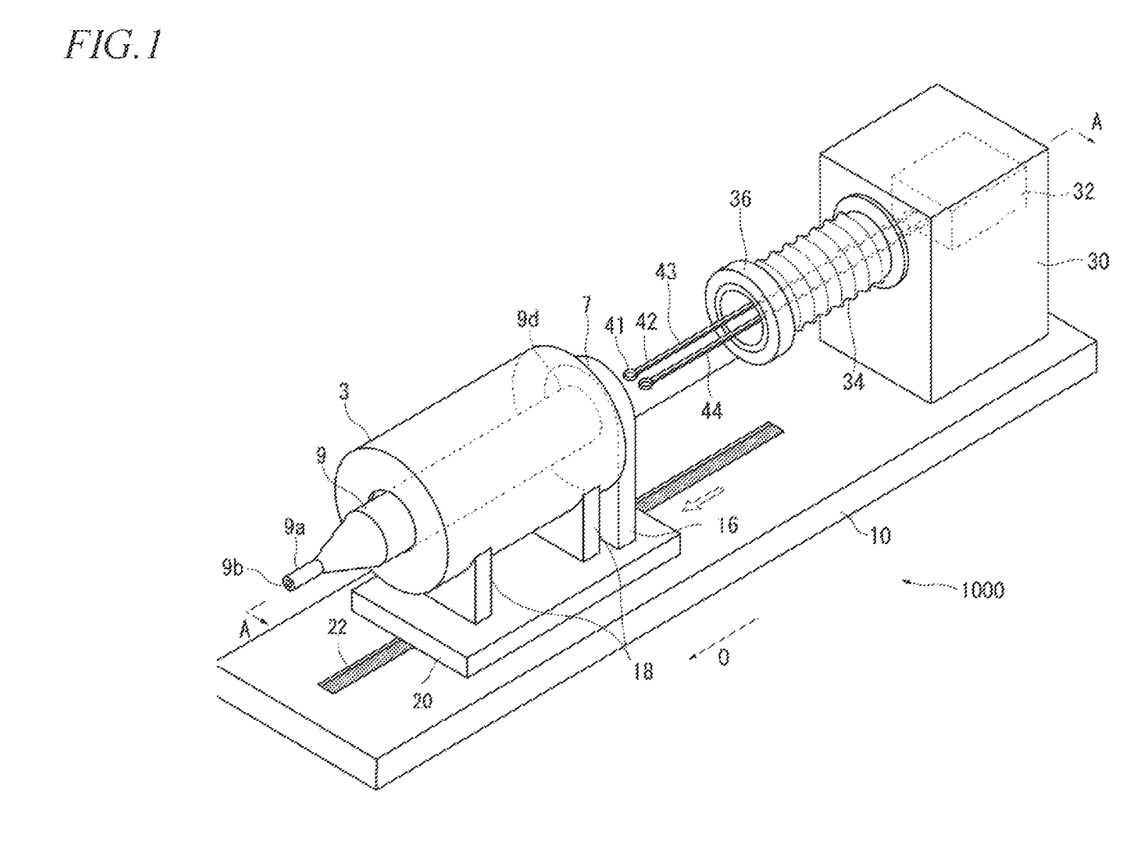
FIG. 1 is a perspective view showing a configuration of a thermal analyzer according to an embodiment of the present disclosure.
Figure 2:
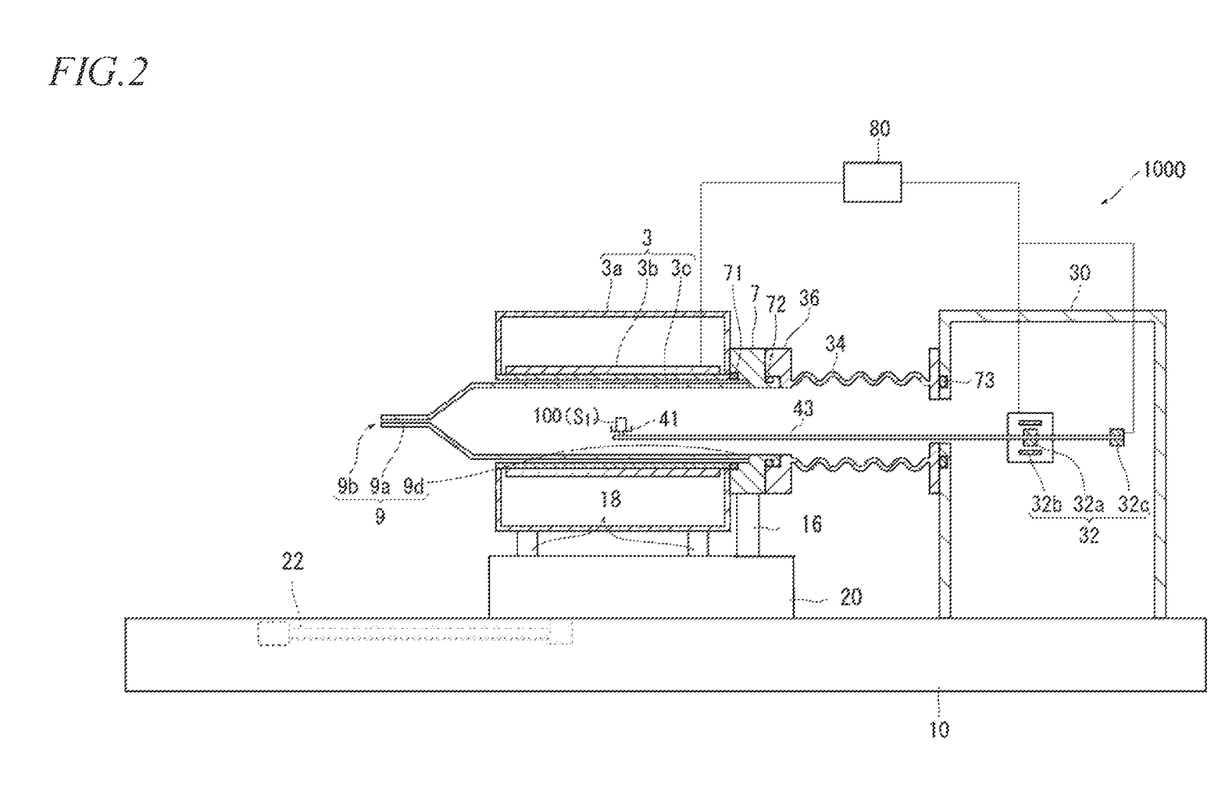
FIG. 2 is a sectional view taken on line A-A in FIG. 1.

FIG. 1 is a perspective view showing a configuration of a thermal analyzer 1000 according to an embodiment according to the present disclosure. FIG. 2 is a sectional view taken on line A-A in FIG. 1.

The thermal analyzer 1000 serves as a thermogravimetric/differential thermal analyzer (TG/DTA) and includes a cylindrical furnace tube 9, a cylindrical heating furnace 3, sample holders 41 and 42, a measurement chamber 30, and weight/calorie detectors 32. The furnace tube 9 is formed into a cylindrical shape and has an exhaust port 9b in a front end portion 9a. The exhaust port 9b has a reduced diameter. The heating furnace 3 surrounds the furnace tube 9 from outside. The sample holders 41 and 42 are disposed inside the furnace tube 9 so as to hold samples $S_1$ and $S_2$ respectively. The measurement chamber 30 is airtightly connected to a rear end portion 9d in an axial direction O of the furnace tube 9. The weight/calorie detectors 32 are disposed in the measurement chamber 30 so as to measure changes in weight or calorie of the samples $S_1$ and $S_2$.

Two supports 18 extend downward from a lower end of the heating furnace 3. The supports 18 are connected to a support table 20. A flange portion 7 is fixed to the outside of the rear end portion 9d of the furnace tube 9, and a support 16 extends downward from a lower end of the flange portion 7. The support 16 is also connected to the support table 20. The support table 20 and the measurement chamber 30 are mounted on a base 10. The support table 20 can be moved forward and backward in the axial direction O of the furnace tube 9 by a linear actuator 22.

The heating furnace 3 heats the sample holders 41 and 42 from the outside of the furnace tube 9. Changes in weight or calorie of the samples $S_1$ and $S_2$ caused by a temperature change can be detected by the weight/calorie detectors 32.

Here, in order to set the samples $S_1$ and $S_2$ in the sample holders 41 and 42 or replace the samples $S_1$ and $S_2$, the support table 20 is moved forward to the front end side of the furnace tube 9 by the linear actuator 22, and the heating furnace 3 and the furnace tube 9 fixed to the support table 20 are also moved forward. As a result, the sample holders 41 and 42 are exposed on the rear end side from the furnace tube 9 so that the samples $S_1$ and $S_2$ can be set or replaced.

The linear actuator 22 is, for example, constituted by a ball screw, a servo motor, etc. Any known actuator that can be driven linearly in the axial direction O may be used.

The heating furnace 3 includes a cylindrical furnace core tube 3c, a heater 3b, and a cylindrical outer cylinder 3a (see FIG. 2). The furnace core tube 3c forms an inner surface of the heating furnace 3. The heater 3b is externally fitted to the furnace core tube 3c. The outer cylinder 3a has side walls at opposite ends thereof. A center hole is provided at the center of each of the opposite side walls of the outer cylinder 3a so that the furnace core tube 3c can be inserted into the center hole. The outer cylinder 3a surrounds the heater 3b and keeps temperature thereof. In addition, adjustment holes (not shown) may be provided suitably in the outer cylinder 3a so as to adjust temperature of the heating furnace 3. Incidentally, the inner diameter of the furnace core tube 3c is larger than the outer diameter of the furnace tube 9. The heating furnace 3 can heat the furnace tube 9 (and the samples $S_1$ and $S_2$ inside the furnace tube 9) in a non-contact manner.

The furnace tube 9 has a tapered shape, whose diameter is reduced toward the front end portion 9a. The front end portion 9a is formed into a long and narrow capillary, and the exhaust port 9b is opened at a front end of the front end portion 9a. Purge gas is suitably introduced into the furnace tube 9 from the rear end side. The purge gas, decomposition products of the samples by heating, etc. are discharged to the outside through the exhaust port 9b. On the other hand, the ring-like flange portion 7 is attached to the outside of the rear end portion 9d of the furnace tube 9 through a seal member 71 (see FIG. 2).

The furnace tube 9 is formed out of a transparent material so that the samples S1 and S2 can be observed from the outside of the furnace tube 9. The transparent material is a material that can transmit visible light with predetermined transmittance, including a translucent material. In addition, quartz glass or sapphire glass can be used suitably as the transparent material. The furnace tube 9 may be formed out of a metal material or the like.

Figure 3:
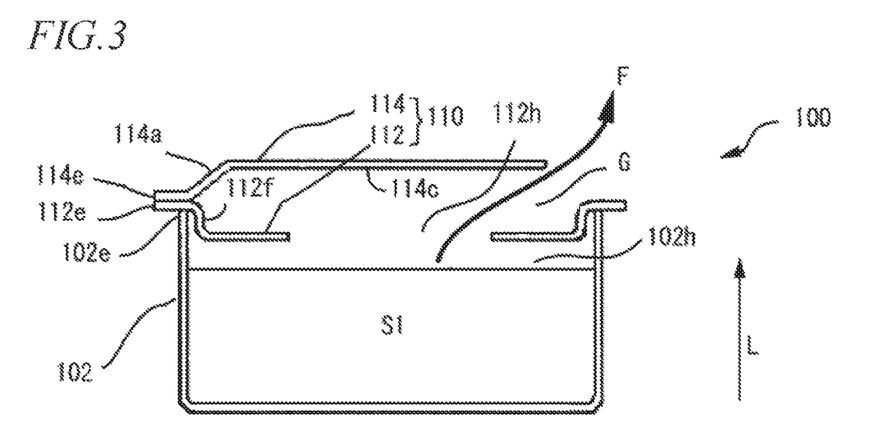
FIG. 3 is a sectional view of a sample container according to a first embodiment of the present disclosure.

Balance arms 43 and 44 extending on the rear end side in the axial direction O are connected to the sample holders 41 and 42 respectively. The balance arms 43 and 44 are arranged horizontally in parallel with each other. Sample containers 100 and 100 shown in FIG. 3 are mounted in the sample holders 41 and 42 respectively, and the samples $S_1$ and $S_2$ are put in the sample containers 100 and 100 respectively. In this disclosure, it is assumed that the sample $S_1$ is a sample to be measured (Sample), and the sample $S_2$ is a reference sample (reference material; Reference). In addition, thermocouples are placed just under the sample holders 41 and 42 so that sample temperatures can be measured. The balance arms 43 and 44, the sample holders 41 and 42, and the sample containers 100 and 100 are, for example, formed out of platinum. In addition, the pair of sample containers 100 and 100 have one and the same shape.

The measurement chamber 30 is disposed at a rear end of the furnace tube 9, and a tubular bellows 34 is attached to a front end portion of the measurement chamber 30. The bellows 34 extends on the front end side in the axial direction O toward the furnace tube 9. A flange portion 36 is formed on the front end side of the bellows 34. The flange portion 36 is airtightly connected to the flange portion 7 through a seal member 72. In this manner, the measurement chamber 30 communicates with the inside of the furnace tube 9, and a rear end of each balance arm 43, 44 passes through the furnace tube 9 and extends into the measurement chamber 30. Incidentally, for example, O-rings, gaskets, etc. may be used as the seal members 71 to 73.

As shown in FIG. 2, each weight/calorie detector 32 disposed in the measurement chamber 30 has a coil 32a, magnets 32b, and a position detection portion 32c. The position detection portion 32c is, for example, constituted by a photosensor, and disposed on the rear end side of each balance arm 43, 44 so as to detect whether the balance arm 43, 44 is in a horizontal state or not. On the other hand, the coil 32a is attached to an axial center (fulcrum) of each balance arm 43, 44, and the magnets 32b are disposed on opposite sides of the coil 32a. A current is applied to the coil 32a to make the balance arm 43, 44 horizontal. The current is measured to measure the weight or calorie of each sample S1, S2 at the front end of the balance arm 43, 44. Incidentally, the weight/calorie detectors 32 are provided for the balance arms 43 and 44 respectively.

As shown in FIG. 2, the linear actuator 22, the heater 3b and the weight/calorie detectors 32 are controlled by a controller 80 which may be a computer or a microprocessor. The controller 80 controls current conduction to the heater 3b to thereby heat the furnace tube 9 (the sample holders 41 and 42) with a predetermined heating pattern, and acquires temperature changes and weight or calorie changes of the samples $S_1$ and $S_2$ at that time from the weight/calorie detectors 32 respectively. The controller 80 also controls operation of the linear actuator 22 to thereby move the heating furnace 3 and the furnace tube 9 in order to set and measure the samples.

Thermal analysis is performed in a position where the flange portion 36 and the flange portion 7 are connected airtightly and the sample holders 41 and 42 (that is, the samples $S_1$ and $S_2$) in the furnace tube 9 are covered with the heating furnace 3.

First Embodiment

Figure 4:
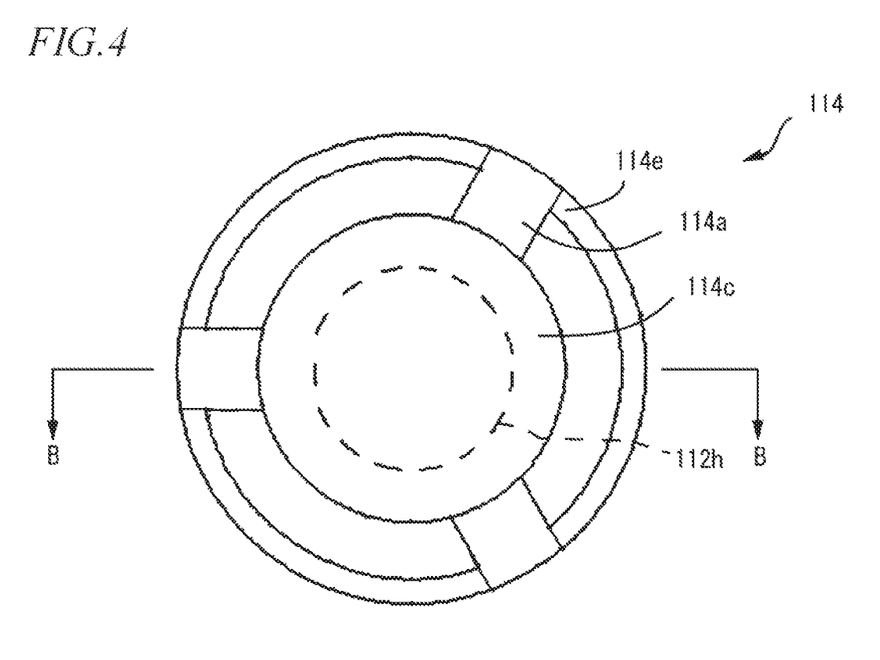
FIG. 4 is a top view of the sample container in FIG. 3.

Next, a sample container 100 according to a first embodiment of the present disclosure will be described with reference to FIG. 3 and FIG. 4. FIG. 3 is a sectional view of the sample container 100 along an axial direction L. FIG. 4 is a top view of the sample container 100. Incidentally, FIG. 3 is a sectional view taken on line B-B in FIG. 4.

The sample container 100 has a bottomed cylindrical body portion 102, and a substantially disc-like cover portion 110. The cover portion 110 abuts against an opening 102h in a top face of the body portion 102 so that the whole of the opening 102h can be covered with the cover portion 110.

The cover portion 110 has a first cover portion 112 and a second cover portion 114. The first cover portion 112 abuts against an edge portion (opening end portion) 102e of the opening 102h. The second cover portion 114 is separated from the first cover portion 112 in the axial direction L of the body portion 102.

The first cover portion 112 has a substantially dish-like shape in which a circular second opening 112h is opened at the center thereof. The first cover portion 112 is bent like a crank toward the outer circumference thereof so that an outer circumferential end portion 112e can be located above a center portion thereof. A crank-like bent portion 112f is received inside the body portion 102, and the outer circumferential end portion 112e abuts on the edge portion 102e.

The second cover portion 114 has a circular central portion 114c at the center thereof. The central portion 114c has a larger diameter than the opening 102h. Arm portions 114a extend radially outward respectively from three places separated from one another by 120 degrees in a circumferential direction of the central portion 114c. Each arm portion 114a is bent downward from the central portion 114c, and an outer circumferential end portion 114e of the arm portion 114a extends horizontally.

The outer circumferential end portions 112e and 114e are joined to face each other so that the second cover portion 114 can be separated from and above the first cover portion 112 through a gap G.

Due to the configuration of the sample container 100, the sample $S_1$ (or $S_2$) received in the body portion 102 communicates with the outside through a path F passing the second opening 112h of the first cover portion 112 and the gap G. Thus, during thermogravimetry or calorimetry involving a heating decomposition reaction, gas generated by heating decomposition of the sample $S_1$ is smoothly discharged to the outside through the path F. It is therefore possible to suppress such an event that the inside of the sample container 100 is filled with the gas (self-generated atmosphere) of the sample $S_1$ to thereby inhibit a reaction between the sample $S_1$ and an ambient atmosphere. Thus, thermogravimetry or calorimetry can be performed without spoiling heating decomposition reaction of the sample.

(In addition, since at least a part of the opening 102h of the body portion 102 is covered with the cover portion 110, influence of radiation occurring between the inner surface of the heating furnace and the sample surface directly through the opening 102h at a high temperature range can be reduced to thereby improve measurement accuracy.)

Thermal transfer by radiation between two objects can be generally expressed by a radiative coefficient. The radiative coefficient can be expressed by a function of two geometric factors expressing geometric shapes between two surfaces of the two objects and emissivities of the two objects. Analysis for obtaining the radiative coefficient under any conditions including the layout of the two objects becomes very complicated.

Therefore, in this disclosure, it is assumed that the thermal transfer by radiation between the inner surface of the heating furnace 3 and the surface of the sample $S_1$ (or $S_2$) simply depend on the magnitude of a solid angle in the inner surface of the heating furnace observed from the sample surface. Thus, a reference point for calculating a solid angle Ωi is defined in the sample surface, and the magnitude of a solid angle from the reference point is obtained to evaluate the influence of the radiation.

Figure 5:
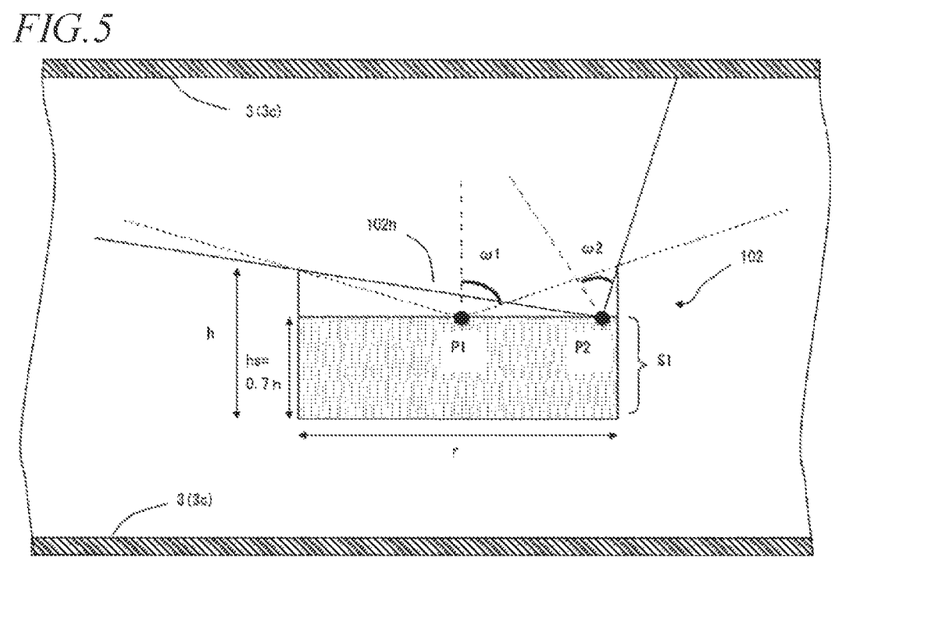
FIG. 5 is a sectional view showing a solid angle when a cover portion of the sample container has been removed to expose an opening of a body portion.

For example, in FIG. 5, a position at the center of the surface of the sample $S_1$ where sample height hs is 0.7 h is defined as the reference point.

Here, the heating furnace 3 can be considered to be much larger than the sample container 100. The degree of the radiation from the heating furnace 3 can be expressed by the solid angle Ωi expressing a range (spreading outward) facing the outside from each point on the surface of the sample $S_1$ (or $S_2$) inside the sample container 100.

FIG. 5 shows the solid angle Ωi when the cover portion 110 has been removed to expose the opening 102h of the body portion 102 (correspondingly to the background art).

The solid angle Ωi is an area in which a spatial region observed from a point Pi is projected onto a spherical surface with a radius of 1. The solid angle expressing spreading in whole spherical directions is $4\pi$ [sr] (steradians). When a spreading angle (opening angle) is $2\omega i$ as shown in FIG. 5, the solid angle $\Omega i$ can be expressed by $2\pi(1-\cos \omega i)$.

Normally, the sample $S_1$ is not fully put to the top face of the body portion 102 but to sample height hs about 0.7 times as high as height h from the bottom portion of the inner surface of the body portion 102 to the opening 102$h$. Therefore, it is assumed that the surface of the sample $S_1$ as a reference for calculating the solid angle $\Omega i$ is in the position of the sample height hs=0.7×h.

The spreading angle (opening angle) $2\omega i$ in each point P1, P2 . . . on the surface of the sample S1 takes a geometric maximum value at the center (center of gravity) of the body portion 102.

As will be described in detail later, a maximum solid angle $\Omega 0$ at the center P1 of the body portion 102 is $2\pi \times 0.712$ when the inner surface of the body portion 102 has a diameter r=5 mm and a height h=2.5 mm.

Figure 6:
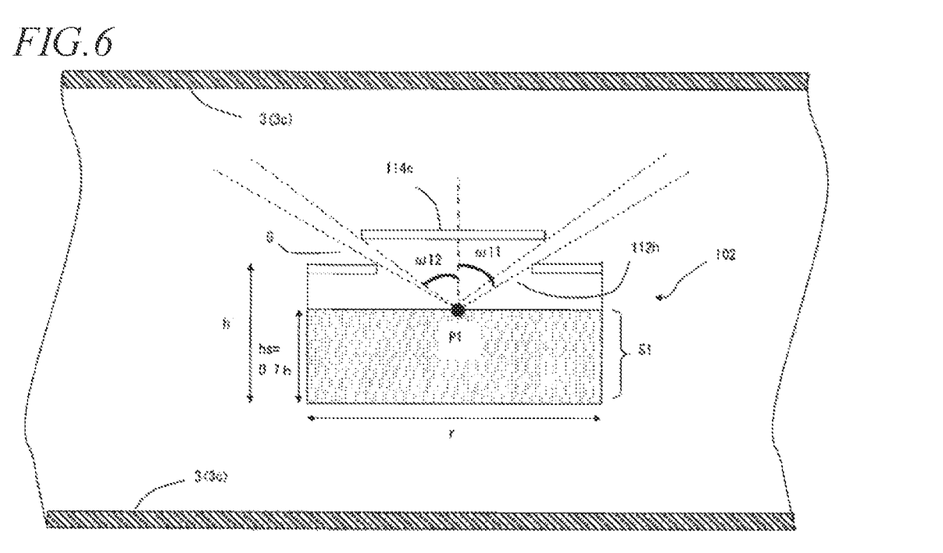
FIG. 6 is a sectional view showing a solid angle of the body portion facing the outside from a point P1 on a surface of a sample through a second opening and a gap when the cover portion has been attached.

On the other hand, FIG. 6 shows a solid angle $\Omega$ facing the outside from the point P1 on the surface of the sample S1 in the body portion 102 through the second opening 112$h$ and the gap G when the cover portion 110 has been attached. Incidentally, the spreading angle (opening angle) $2\omega$ takes a geometric maximum value at the center (center of gravity) of the body portion 102. As shown in FIG. 6, the spreading angle (opening angle) is $2\omega_{11}$ and the spreading angle (opening angle) shielded by the second cover portion 114 (not to see the outside) is $2\omega_{12}$. Therefore, a maximum solid angle $\Omega m$ can be expressed by $\{2\pi(1-\cos \omega_{11})-2\pi(1-\cos \omega_{12})\}$.

Incidentally, the arm portion 114$a$ is ignored in the calculation of the maximum solid angle $\Omega m$.

As will be described in detail later, the maximum solid angle $\Omega m$ at the center P1 of the body portion 102 is $2\pi \times 0.118$ when the inner surface of the body portion 102 has a diameter r=5 mm and a height h=2.5 mm, the second cover portion 114 has a diameter of 3.8 mm, the second opening 112$h$ has a diameter of 2.5 mm, and a distance in the axial direction L between the first cover portion 112 and the second cover portion 114 is 0.8 mm.

That is, a maximum solid angle ratio ($\Omega m/\Omega 0$) of the solid angle $\Omega m$ to that in the case where the cover portion 110 is absent is about 0.17. Thus, the influence of radiation from the heating furnace can be surely reduced.

It is preferable that the maximum solid angle ratio ($\Omega m/\Omega 0$) is not larger than 0.3 because the influence of radiation from the heating furnace can be reduced effectively.

Figure 7:
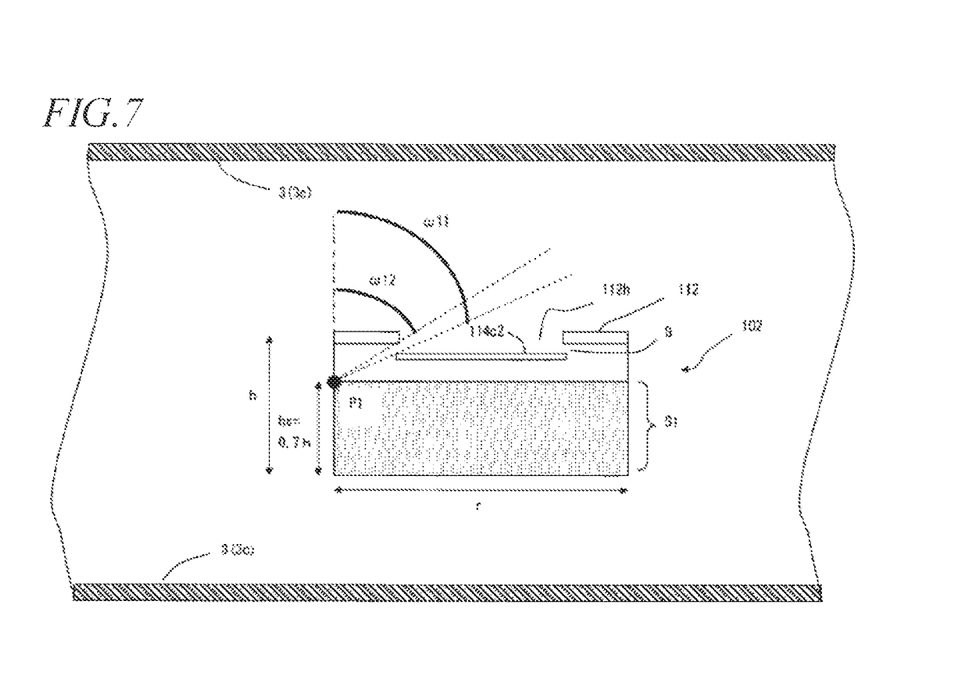
FIG. 7 is a sectional view showing a modification of the sample container according to the first embodiment.

FIG. 7 shows a modification of the sample container 100 according to the first embodiment. In the modification of FIG. 7, the second cover portion 114 is disposed under the first cover portion 112 (on the sample $S_1$ side therefrom) in the axial direction L. The point P1 on the surface of the sample $S_1$ taking the maximum solid angle $\Omega m$ is located on the outer circumference of the inner surface of the body portion 102. Also in this case, the maximum solid angle $\Omega m$ can be expressed by $\{2\pi(1-\cos \omega_{11})-2\pi(1-\cos \omega_{12})\}$.

Second Embodiment

Figure 8:
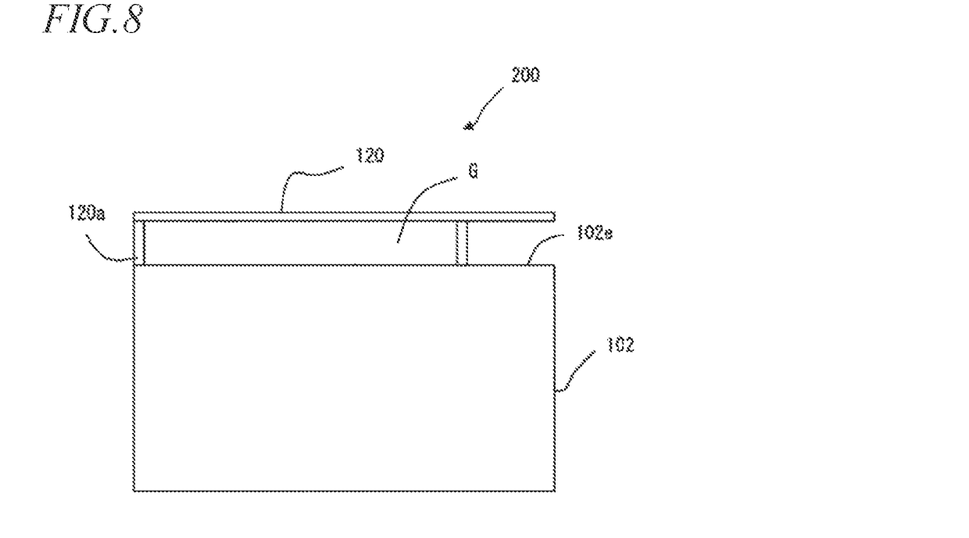
FIG. 8 is a side view of a sample container according to a second embodiment of the present disclosure.
Figure 9:
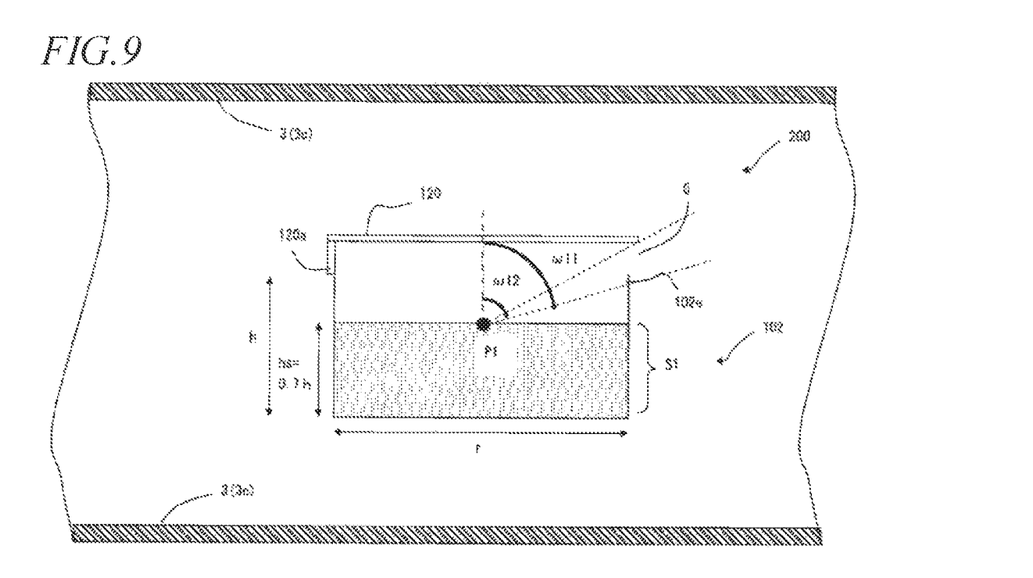
FIG. 9 is a sectional view of the sample container according to the second embodiment.

Next, a sample container 200 according to a second embodiment of the present disclosure will be described with reference to FIG. 8 and FIG. 9. FIG. 8 is a side view of the sample container 200, and FIG. 9 is a sectional view of the sample container 200 along the axial direction L. Incidentally, of the sample container 200, constituent parts the same as those of the sample container 100 according to the first embodiment are referenced correspondingly, and description thereof will be omitted.

The sample container 200 has a bottomed cylindrical body portion 102, and a substantially disc-like cover portion 120. The cover portion 120 has a larger diameter than an opening 102$h$ in a top face of the body portion 102 so that the whole of the opening 102$h$ can be covered with the cover portion 120 when observed from the axial direction L.

Arm portions 120$a$ extend downward in the axial direction L respectively from three places separated from one another by 120 degrees in a circumferential direction of an outer circumferential portion of the cover portion 120. The cover portion 120 is attached to the body portion 102 so as to be separated therefrom in the axial direction L so that lower ends of the arm portions 120$a$ can abut against an edge portion (opening end portion) of the opening 102$h$.

In this manner, a sample $S_1$ (or $S_2$) received in the body portion 102 can communicate with the outside through a gap G between the cover portion 120 and the body portion 102.

Incidentally, a point P1 on a surface of the sample S1 taking a maximum solid angle $\Omega m$ is set at the center of the sample surface in the body portion 102. Also in this case, the maximum solid angle $\Omega m$ can be expressed by $\{2\pi(1-\cos \omega_{11})-2\pi(1-\cos \omega_{12})\}$. In addition, the arm portion 120$a$ is ignored in the calculation of the maximum solid angle $\omega m$.

Third Embodiment

Figure 10:
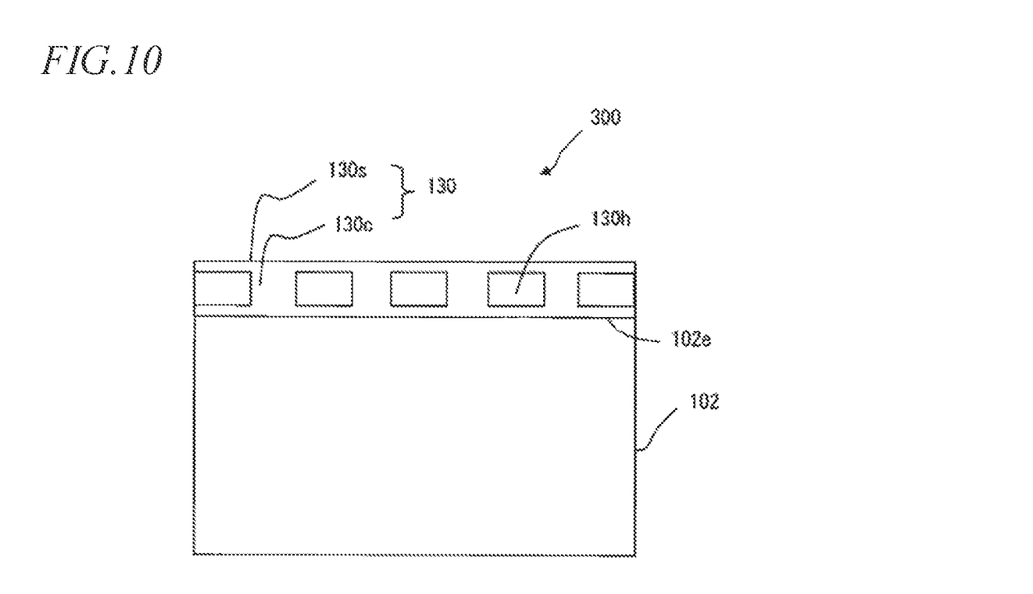
FIG. 10 is a side view of a sample container according to a third embodiment of the present disclosure.
Figure 11:
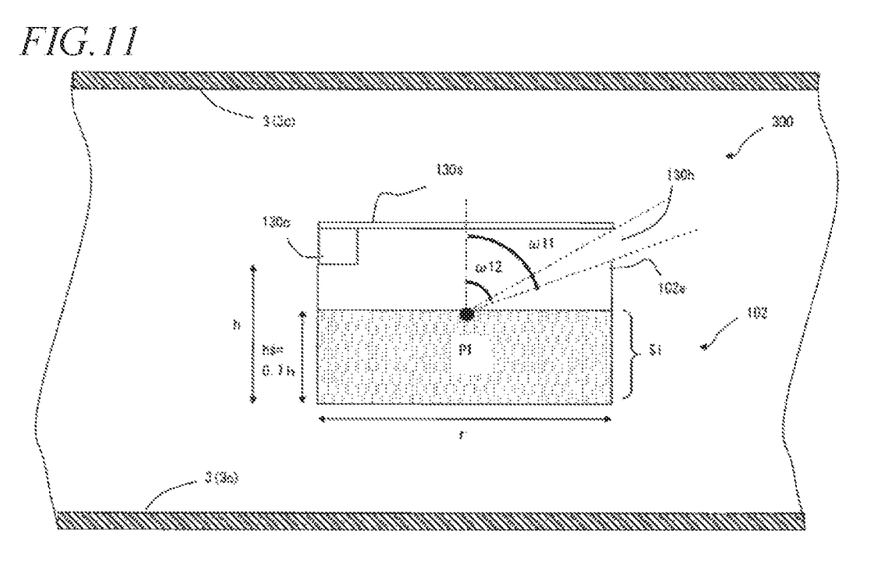
FIG. 11 is a sectional view of the sample container according to the third embodiment.

Next, a sample container 300 according to a third embodiment of the present disclosure will be described with reference to FIG. 10 and FIG. 11. FIG. 10 is a side view of the sample container 300, and FIG. 11 is a sectional view of the sample container 300 along the axial direction L. Incidentally, of the sample container 300, constituent parts the same as those of the sample container 100 according to the first embodiment are referenced correspondingly, and description thereof will be omitted.

The sample container 300 has a bottomed cylindrical body portion 102, and a bottomed cylindrical cover portion 130. The cover portion 130 has substantially the same diameter as the body portion 102 so that the whole of an opening 102$h$ can be covered with the cover portion 130 when observed from the axial direction L.

The cover portion 130 has a bottom portion 130$s$ and a cylindrical portion 130$c$. The cylindrical portion 130$c$ extends downward in the axial direction L from the outer circumference of the bottom portion 130$s$. Slit-like third openings 130$h$ are provided at equal intervals in a circumferential direction of a surface of the cylindrical portion 130$c$. The cover portion 130 is attached to the body portion 102 so that a low end of the cylindrical portion 130$c$ can abut against an edge portion (opening end portion) 102$e$ of the opening 102$h$.

In this manner, a sample $S_1$ (or $S_2$) received in the body portion 102 can communicate with the outside through the third openings 130$h$.

Incidentally, in this embodiment, a point P1 on a surface of the sample $S_1$ taking a maximum solid angle $\Omega m$ is set at the center of the sample surface in the body portion 102. Also in this case, the maximum solid angle $\Omega m$ can be expressed by $\{2\pi(1-\cos \omega_{11})-2\pi(1-\cos \omega_{12})\}$. In addition, in order to calculate the maximum solid angle $\Omega m$, the area of the whole circumference of the cylindrical portion 130$c$ corresponding to the part where each third opening 130$h$ is formed when observed in the height direction of the sample container 300 is obtained, and weighting is performed with a ratio Sx of the area of the third opening 130*h* to the area of the whole circumference. That is, the maximum solid angle $\Omega$m obtained as shown in FIG. 11 is multiplied by the ratio Sx. A value obtained thus is used as a final maximum solid angle $\Omega$m.

Fourth Embodiment

Figure 12:
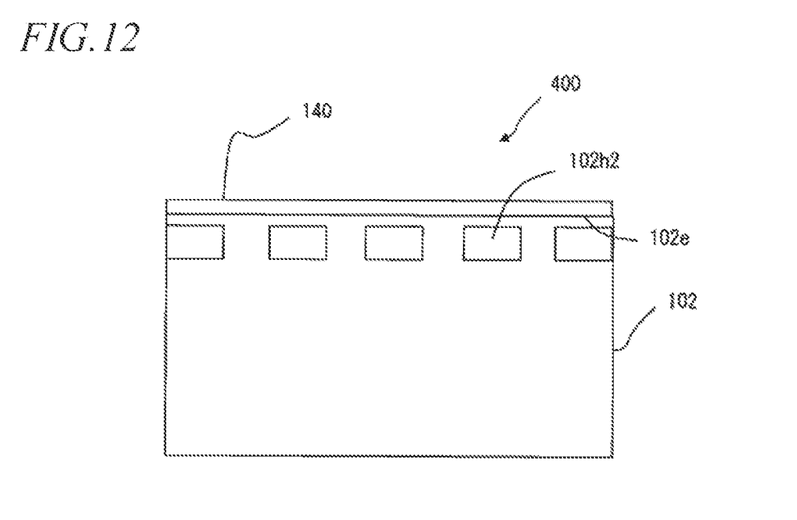
FIG. 12 is a side view of a sample container according to a fourth embodiment of the present disclosure.
Figure 13:
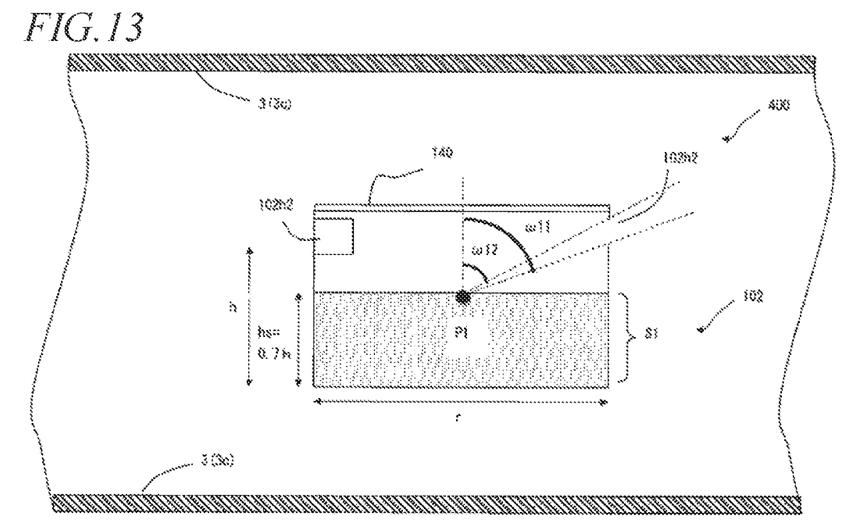
FIG. 13 is a sectional view of the sample container according to the fourth embodiment.

Next, a sample container 400 according to a fourth embodiment of the present disclosure will be described with reference to FIG. 12 and FIG. 13. FIG. 12 is a side view of the sample container 400, and FIG. 13 is a sectional view of the sample container 400 along the axial direction L. Incidentally, of the sample container 400, constituent parts the same as those of the sample container 100 according to the first embodiment are referenced correspondingly, and description thereof will be omitted.

The sample container 400 has a bottomed cylindrical body portion 102, and a substantially disc-like cover portion 140. The cover portion 140 has substantially the same diameter as the body portion 102 so that the whole of an opening 102*h* can be covered with the cover portion 140 when observed from the axial direction L. The cover portion 140 is attached to the body portion 102 so as to abut against an edge portion 102*e* of the opening 102*h*. On the other hand, slit-like fourth openings 102*h*2 are provided at equal intervals in a circumferential direction of a surface of a cylindrical portion of the body portion 102.

In this manner, a sample $S_1$ (or $S_2$) received in the body portion 102 can communicate with the outside through the fourth openings 102*h*2.

Incidentally, in this embodiment, a point P1 on a surface of the sample $S_1$ taking a maximum solid angle $\Omega$m is set at the center of the sample surface in the body portion 102. Also in this case, the maximum solid angle $\Omega$m can be expressed by $\{2\pi(1-\cos \omega_{11})-2\pi(1-\cos \omega_{12})\}$. In addition, in order to calculate the maximum solid angle $\Omega$m, the area of the whole circumference of the cylindrical portion of the body portion 102 corresponding to the part where each fourth opening 102*h*2 is formed when observed in the height direction of the sample container 400 is obtained in a part of the cylindrical portion above sample height hs (=0.7×h) corresponding to the surface of the sample S1, and weighting is performed with a ratio Sy of the area of the fourth opening 102*h*2 to the area of the whole circumference. That is, the maximum solid angle $\Omega$m obtained as shown in FIG. 13 is multiplied by the ratio Sy. A value obtained thus is used as a final maximum solid angle $\Omega$m.

<Thermal Analyzer>

Figure 14:
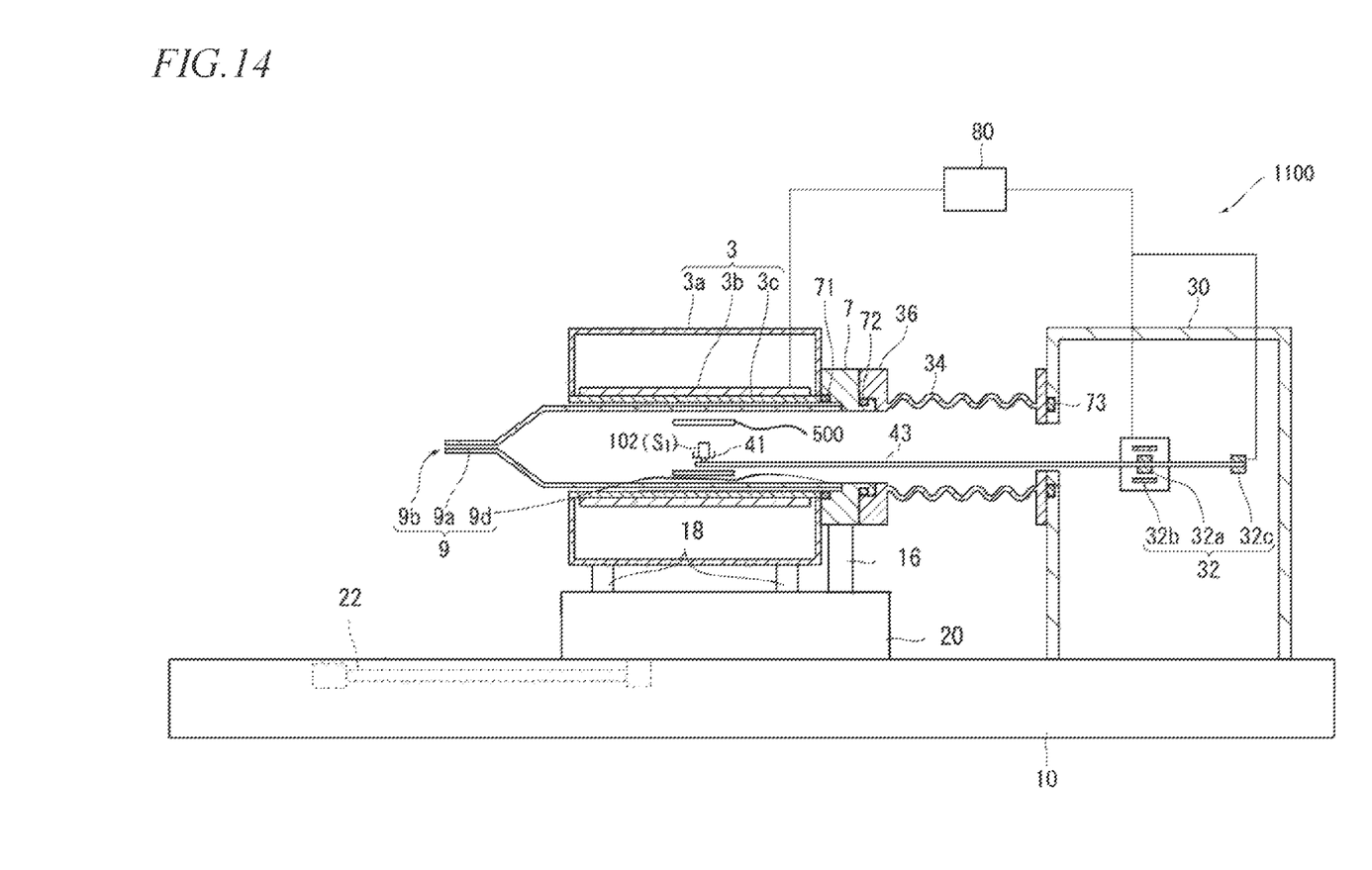
FIG. 14 is a sectional view of a thermal analyzer according a second invention belonging to the present disclosure.
Figure 15:
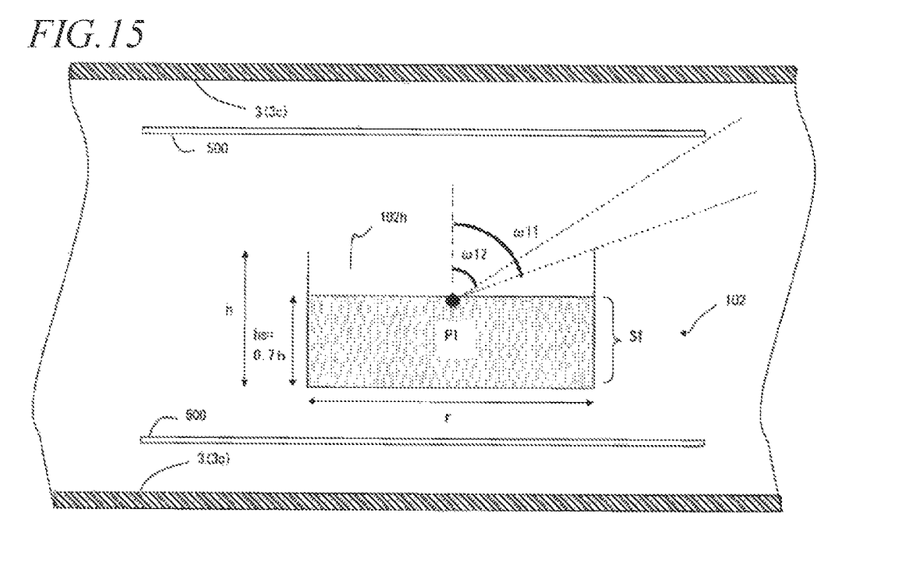
FIG. 15 is a partially enlarged sectional view of FIG. 14.

Next, a thermal analyzer 1100 according to an embodiment of a present disclosure will be described with reference to FIG. 14 and FIG. 15. FIG. 14 is a sectional view of the thermal analyzer 1100, taken along an axial direction O of a furnace tube 9. FIG. 15 is a partially enlarged sectional view of FIG. 14.

The thermal analyzer 1100 serves as a thermogravimetric/differential thermal analyzer (TG/DTA) and includes a cylindrical furnace tube 9, a cylindrical heating furnace 3, sample holders 41 and 42, a measurement chamber 30, weight/calorie detectors 32, sample containers 102, and a cylindrical reflection member 500. The furnace tube 9 is formed into a cylindrical shape and has an exhaust port 9*b* in a front end portion 9*a*. The exhaust port 9*b* has a reduced diameter. The heating furnace 3 surrounds the furnace tube 9 from outside. The sample holders 41 and 42 are disposed inside the furnace tube 9 so as to hold samples $S_1$ and $S_2$ respectively. The measurement chamber 30 is airtightly connected to a rear end portion 9*d* in an axial direction $\theta$ of the furnace tube 9. The weight/calorie detectors 32 are disposed in the measurement chamber 30 so as to measure changes in weight or calorie of the samples $S_1$ and $S_2$. The reflection member 500 will be described later.

The thermal analyzer 1100 is the same as the thermal analyzer 1000 according to the embodiment of the first invention, except for the sample containers 102 and the reflection member 500. Therefore, constituent parts the same as those in the thermal analyzer 1000 are referenced correspondingly, and description thereof will be omitted.

Each sample container 102 has the same bottomed cylindrical shape as the aforementioned body portion 102 in the sample container 100 in FIG. 3. The sample container 102 has an opening portion 102*h* in its top face. The sample container 102 is an uncovered container that has been used in the background art.

The reflection member 500 is a cylindrical body having a smaller diameter than the inner surface of a furnace core tube 3*c* of the heating furnace 3, and having a diameter large enough to cover the sample container 102. The reflection member 500 is made of a material lower in emissivity than the surface of the heating furnace 3 in order to reflect radiation from the heating furnace 3. The reflection member 500 can be, for example, formed by bending a Pt plate into a cylindrical shape. The Pt plate is generally lower in emissivity than alumina of which the heating furnace is formed.

The reflection member 500 is disposed in a position between the sample container 102 and the heating furnace 3 so that the sample container 102 can be covered with the reflection member 500. For example, the reflection member 500 can be placed in such a manner that a Pt cylinder whose outer diameter is substantially as large as the inner diameter of the heating furnace 3 is inserted directly into the heating furnace.

As shown in FIG. 15, when the reflection member 500 is attached, a spreading angle (opening angle) 2*w* facing the outside through the opening 102*h* from a point P1 on a surface of the sample $S_1$ in the sample container 102 takes a geometric maximum value at the center (center of gravity) of the body portion 102. The spreading angle (opening angle) is $2\omega_{11}$ and the spreading angle (opening angle) shielded by the reflection member 500 (not to see the outside) is $2\omega_{12}$. Therefore, a maximum solid angle $\Omega$m can be expressed by $\{2\pi(1-\cos \omega_{11})-2\pi(1-\cos \omega_{12})\}$.

That is, when the reflection member 500 is provided, a part of radiation from the heating furnace 3 is shielded by the reflection member 500 in spite of absence of a cover portion in the sample container 102. Thus, the maximum solid angle $\Omega$m is made smaller than $\Omega$0 (see FIG. 5), so that influence of radiation from the heating furnace 3 can be reduced.

Also in the thermal analyzer 1100 according to the embodiment of the second invention belonging to the present disclosure, the influence of radiation from the heating furnace 3 can be surely reduced when the maximum solid angle ratio ($\Omega$m/$\Omega$0) is not larger than 0.3.

The present invention is not limited to the aforementioned embodiments, but it is a matter of course that the present invention includes various modifications and equivalents included in the idea and scope of the present invention.

For example, shapes, arrangement states, etc. of a sample container, a cover portion, openings, etc. are not limited to those in the aforementioned embodiments.

In addition, a thermal analyzer according the present disclosure can be applied not only to the aforementioned thermogravimetric/differential thermal analyzer (TG/DTA)

defined in JIS K 0129:2005 "General rules for thermal analysis", but also to a thermal analyzer which measure physical properties of an object to be measured (sample) while program-controlling temperature of the sample, and which is mounted with differential scanning calorimetry (DSC) for detecting a difference in thermal flow.

Example 1

The sample containers 100 shown in FIG. 3 and FIG. 4 were manufactured and disposed in the thermal analyzer 1000 shown in FIG. 1 and FIG. 2 so as to perform thermal analysis. Alumina power and a sapphire disc were put into the sample containers 100 respectively as samples. Containers on the reference side were made empty. Thus, differential thermal analysis (DTA) was performed on the respective samples.

Emissivities of the alumina powder and the sapphire disc were about 0.35 and 0.02 or lower respectively. Those emissivities of the two were conspicuously different from each other. For the sapphire disc (sapphire sample) low in emissivity, influence of radiation could be substantially ignored.

Figure 16:
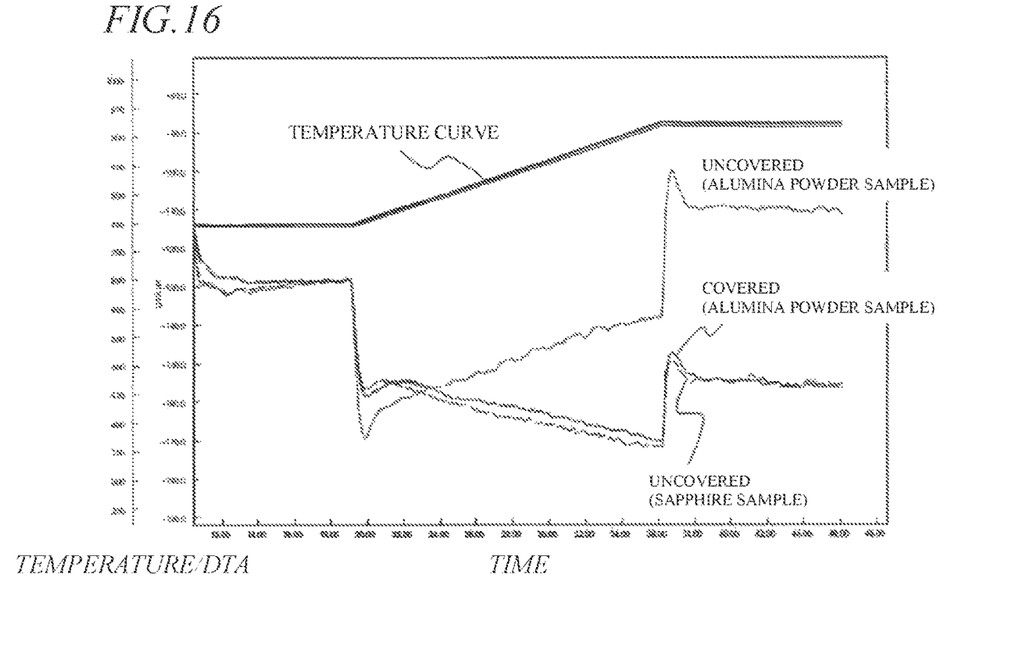
FIG. 16 is a graph showing changes with time of specific heats of alumina powder and sapphire when differential scanning calorimetry (DSC) was performed on the alumina power and the sapphire put in sample containers respectively.

Results are shown in FIG. 16. "Uncovered" in FIG. 16 shows a case where a cover portion 110 was removed from each sample container 100, and a sample (alumina powder, sapphire disc) was put directly into a body portion 102 of the sample container 100. On the other hand, "covered" shows a case where alumina powder was put into a body portion 102, and the body portion 102 was covered with a cover portion 110.

"Uncovered (sapphire sample)" in FIG. 16 shows a DTA curve of sapphire in which the influence of radiation can be substantially ignored. The curve expresses a reference (a reference state where there is no influence of radiation).

A DTA curve of "covered (alumina powder sample)" substantially coincides with the DTA curve of "uncovered (sapphire sample)". It was proved that the cover portion 110 could reduce the influence of radiation from the heating furnace 3 effectively to improve the measurement accuracy of thermogravimetric/differential thermal analysis.

On the other hand, a DTA curve of "uncovered (alumina powder sample)" measured in the same manner except that the cover portion 110 was removed from the sample container 100 was largely different from the DTA curve of "uncovered (sapphire sample)". It was proved that the "uncovered (alumina powder sample)" suffered influence of radiation from the heating furnace 3.

According to the present disclosure, there is provided a sample container and a thermal analyzer in which measurement accuracy of thermogravimetry or calorimetry can be improved without spoiling a thermal decomposition reaction of a sample.

As described with reference to the preferred embodiments, according to a first aspect of the present disclosure, there is provided a sample container of a thermal analyzer that performs thermogravimetry or calorimetry, the sample container including: a body portion that has a bottomed cylindrical shape; and a cover portion that abuts against an opening of the body portion and covers at least a part of the opening, wherein the cover portion includes a first cover portion and a second cover portion, wherein the first cover portion abuts against an edge portion of the opening of the body portion and has a second opening, and wherein the second cover portion is separated from the first cover portion in an axial direction of the body portion and covers at least a part of the second opening.

According to the sample container of the first aspect, a sample received in the body portion communicates with the outside through a path passing the second opening of the first cover portion and a gap between the first cover portion and the second cover portion. Accordingly, during thermogravimetry or calorimetry involving a thermal decomposition reaction, gas generated by thermal decomposition of the sample can be smoothly discharged to the outside through the path. It is therefore possible to suppress such an event that the inside of the sample container is filled with the gas (self-generated atmosphere) of the sample to thereby inhibit a reaction between the sample and an ambient atmosphere. Thus, thermogravimetry or calorimetry (differential calorimetry) can be performed without spoiling the heating decomposition reaction of the sample.

In addition, since at least a part of the opening of the body portion is covered with the cover portion, radiation directly entering into the opening from the heating furnace at a high temperature range can be reduced to thereby reduce influence of the radiation and improve measurement accuracy.

According to a first aspect, there is provided a sample container of a thermal analyzer that performs thermogravimetry or calorimetry, the sample container including: a body portion that has a bottomed cylindrical shape; and a cover portion that covers at least a part of an opening wherein the cover portion is separated from the body portion in an axial direction of the body portion.

According to the sample container of the second aspect, a sample received in the body portion communicates with the outside through a path passing through a gap between the body portion and the cover portion. Accordingly, during thermogravimetry or calorimetry involving a thermal decomposition reaction, gas generated by thermal decomposition of the sample can be smoothly discharged to the outside through the path. It is therefore possible to suppress such an event that the inside of the sample container is filled with the gas (self-generated atmosphere) of the sample to thereby inhibit a reaction between the sample and an ambient atmosphere. Thus, thermogravimetry or calorimetry can be performed without spoiling the heating decomposition reaction of the sample.

In addition, since at least a part of the opening of the body portion is covered with the cover portion, radiation directly entering into the opening from the heating furnace at a high temperature range can be reduced to thereby reduce influence of the radiation and improve measurement accuracy.

According to a third aspect, there is provided a sample container of a thermal analyzer that performs thermogravimetry or calorimetry, the sample container including: a body portion that has a bottomed cylindrical shape; and a cover portion that t has a bottomed cylindrical shape and abuts against an edge portion of an opening of the body portion and covers at least a part of the opening, wherein the cover portion has a cylindrical portion that abuts against the edge portion, the cylindrical portion having a third opening.

According to the sample container of the third aspect, a sample received in the body portion communicates with the outside through a path passing the third opening of the cover portion. Accordingly, during thermogravimetry or calorimetry involving a thermal decomposition reaction, gas generated by thermal decomposition of the sample can be smoothly discharged to the outside through the path. It is therefore possible to suppress such an event that the inside of the sample container is filled with the gas (self-generated atmosphere) of the sample to thereby inhibit a reaction between the sample and an ambient atmosphere. Thus, thermogravimetry or calorimetry can be performed without spoiling the heating decomposition reaction of the sample.

In addition, since at least a part of the opening of the body portion is covered with the cover portion, radiation directly entering into the opening from the heating furnace at a high temperature range can be reduced to thereby reduce influence of the radiation and improve measurement accuracy.

According to a fourth aspect, there is provided a sample container of a thermal analyzer that performs thermogravimetry or calorimetry, the sample container including: a body portion that has a bottomed cylindrical shape; and a cover portion that abuts against an edge portion of an opening of the body portion and covers at least a part of the opening, wherein the body portion has a cylindrical portion having a fourth opening.

According to the sample container of the fourth aspect, a sample received in the body portion communicates with the outside through a path passing the fourth opening. Accordingly, during thermogravimetry or calorimetry involving a thermal decomposition reaction, gas generated by thermal decomposition of the sample can be smoothly discharged to the outside through the path. It is therefore possible to suppress such an event that the inside of the sample container is filled with the gas (self-generated atmosphere) of the sample to thereby inhibit a reaction between the sample and an ambient atmosphere. Thus, thermogravimetry or calorimetry can be performed without spoiling the heating decomposition reaction of the sample.

In addition, since at least a part of the opening of the body portion is covered with the cover portion, radiation directly entering into the opening from the heating furnace at a high temperature range can be reduced to thereby reduce influence of the radiation and improve measurement accuracy.

According to a fifth aspect, the sample container according to any one of the first aspect through the fourth aspect may be configured that, when viewed from sample height hs that is 0.7 of height h from a bottom portion of an inner surface of the body portion to the opening, a maximum solid angle $\Omega m$ facing an outside from the opening, the second opening, the third opening and the fourth opening is not larger than 0.3 of a maximum solid angle $\Omega 0$ facing the outside from the sample height hs in a state where the cover portion is removed.

The heating furnace can be considered to be much larger than the sample container. Therefore, the degree of radiation from the heating furnace can be expressed by a solid angle expressing a range (spreading outward) facing the outside from each point on a surface of the sample inside the sample container. According to the sample container of the thermal analyzer, the ratio of the maximum solid angle to that in the case where the cover portion is absent is not larger than 0.3. It is therefore possible to surely reduce the influence of the radiation from the heating furnace.

According to a sixth aspect, there is also provided a thermal analyzer that performs thermogravimetry or calorimetry including: the sample container according to any one of the firs aspect through the fifth aspect; and a heating furnace that surrounds the sample container.

According to a seventh aspect, there is provided a thermal analyzer that performs thermogravimetry or calorimetry including: a sample container that has a bottomed cylindrical shape and an opening; a heating furnace that surrounds the sample container; and a reflection member that is provided at a position between the sample container and the heating furnace and reflects radiation from the heating furnace.

According to the thermal analyzer of the seventh aspect, the reflection member is disposed in a position where the sample container can be covered with the reflection member between the sample container and the heating furnace. Accordingly, even when there is no cover portion in the sample container, the reflection member can shield a part of radiation from the heating furnace to thereby reduce influence of the radiation from the heating furnace.

According to an eighth aspect the thermal analyzer according to the seventh aspect may be configured that, when viewed from sample height hs that is 0.7 of height h from a bottom portion of an inner surface of a body portion of the sample container to the opening, a maximum solid angle $\Omega m$ facing an outside excluding the reflection member from the opening is not larger than 0.3 of a maximum solid angle $\Omega 0$ facing the outside including the reflection member from the sample height hs.

What is claimed is:

1. A thermal analyzer that performs thermogravimetry or calorimetry, comprising:
    a sample container; and
    a heating furnace that surrounds the sample container,
    wherein the sample container comprises:
        a body portion that has a bottomed cylindrical shape;
        a first cover portion; and
        a second cover portion, the first cover portion being disposed between the body portion and the second cover portion, and
    wherein, in the sample container,
        the first cover portion abuts against an edge portion of a first opening of the body portion while covering at least a part of the first opening,
        the second cover portion has a circular shape and includes a plurality of second openings arranged along a circumferential direction of the second cover portion, the second cover portion being separable from the first cover portion, and
        the first cover portion includes a third opening, the third opening at least partially overlapping the first opening of the body portion.

2. The thermal analyzer according to claim 1, wherein, when viewed from sample height hs that is 0.7 of height h from a bottom portion of an inner surface of the body portion to the first opening, a maximum solid angle $\Omega m$ facing an outside from the first opening, and each of the second openings is not larger than 0.3 of a maximum solid angle $\Omega 0$ facing the outside from the sample height hs in a state where the first and second cover portions are removed.

3. The thermal analyzer of claim 1, wherein the second cover portion includes a circular part having a diameter smaller than a diameter of the first cover portion.

4. The thermal analyzer of claim 3, wherein the second cover portion first includes a plurality of arm parts extending from the circular part, the plurality of arm parts abutting against the first cover portion when the second cover portion is attached to the first cover portion.

* * * * *